United States Patent [19]
Beil

[11] 3,747,702
[45] July 24, 1973

[54] CEMENT EVALUATION LOGGING UTILIZING REFLECTION COEFFICIENTS

[75] Inventor: Ralph G. Beil, Houston, Tex.

[73] Assignee: Schlumberger Technology Corporation, New York, N.Y.

[22] Filed: May 25, 1970

[21] Appl. No.: 40,021

Related U.S. Application Data

[63] Continuation-in-part of Ser. No. 840,335, July 7, 1969.

[52] U.S. Cl. ...................... 181/.5 BE, 340/15.5 AC
[51] Int. Cl. .............................................. G01v 1/00
[58] Field of Search ..................... 181/.5 BE, .5 AP; 340/18 FM, 18 F, 15.5 CF, 15.5 BH, 15.5 A, 15.5 AC

[56] References Cited
UNITED STATES PATENTS

| | | | |
|---|---|---|---|
| 3,401,772 | 9/1968 | Kokesh | 181/.5 AC |
| 3,121,856 | 2/1964 | Finney | 340/15.5 CF |
| 2,573,133 | 10/1951 | Greer | 340/18 FM |
| 3,215,934 | 11/1965 | Sallen | 340/15.5 CF |

FOREIGN PATENTS OR APPLICATIONS

| | | | |
|---|---|---|---|
| 739,617 | 7/1966 | Canada | 181/.5 |

*Primary Examiner*—Samuel Feinberg
*Assistant Examiner*—J. V. Doramus
*Attorney*—Ernest R. Archambeau, Jr., David L. Moseley, William R. Sherman, Stewart F. Moore, Jerry M. Presson, Edward M. Roney, Michael J. Berger and James C. Kesterson

[57] ABSTRACT

In accordance with principles of the present invention, methods and apparatus are provided for evaluating the cement effectiveness in cased boreholes. Acoustic energy is used to excite the borehole-casing-annulus-formation system and the radial transfer of energy into the formation is determined by examining the reflection coefficients of the system in a plurality of relatively wide frequency bands over the spectrum of the acoustic energy used to excite the system. The spectrum analysis is carried out by passing electrical signals representative of the reflected acoustic energy through a plurality of relatively wide bandpass filters whose center frequencies are selected according to the size of the casing being logged. A relatively low magnitude of the reflection coefficient in a majority of these filters is indicative of a good cement condition.

45 Claims, 13 Drawing Figures

United States Patent [19]
Beil
[11] 3,747,702
[45] July 24, 1973
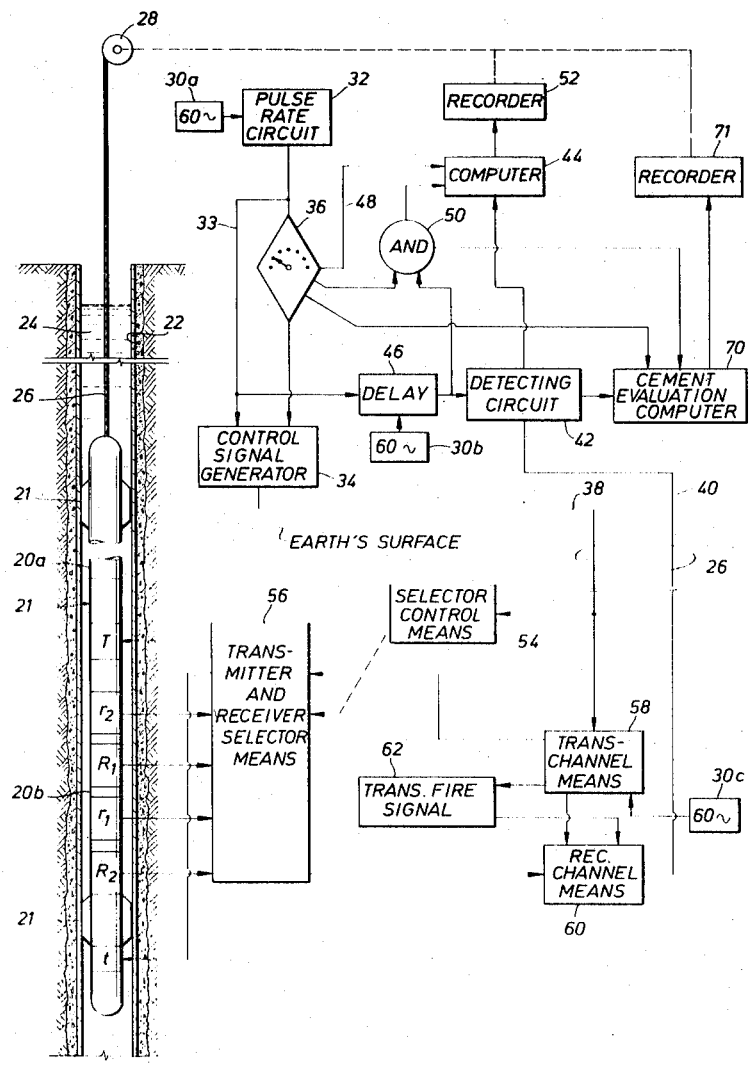

PATENTED JUL 24 1973 3,747,702
SHEET 1 OF 7
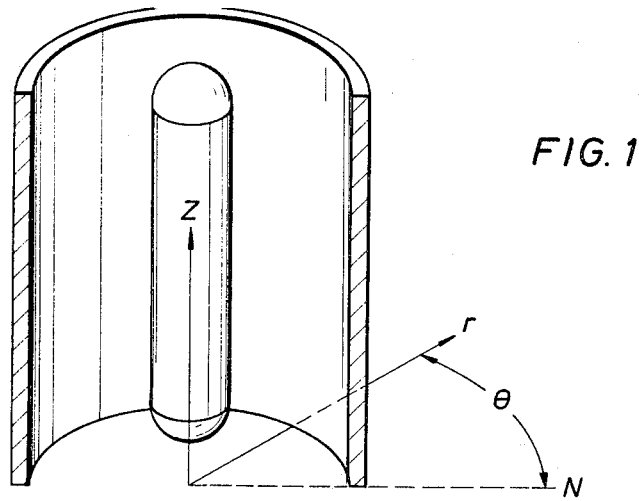
FIG. 1
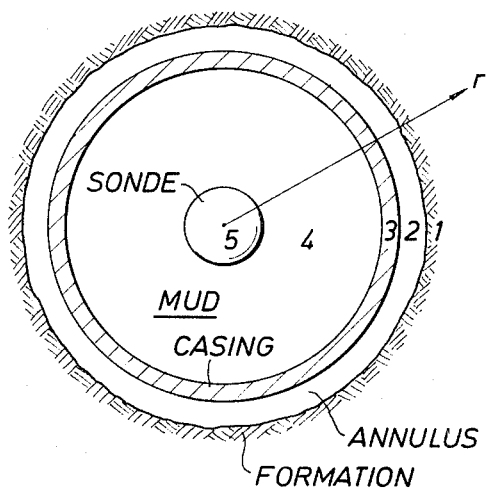
FIG. 2
FIG. 8
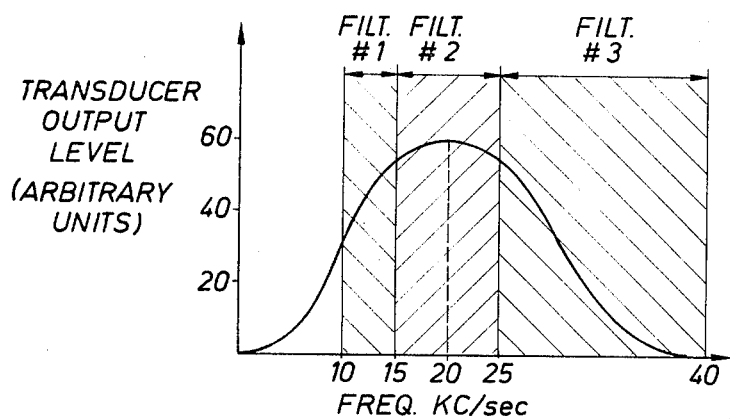
Ralph G. Beil
INVENTOR
BY William J. Beard
ATTORNEY Ralph G. Beil
INVENTOR BY William J Beard
ATTORNEY Ralph G. Beil
INVENTOR BY William J Beard

ATTORNEY

Ralph G. Beil
INVENTOR

BY William J. Beard
ATTORNEY

CEMENT EVALUATION LOGGING UTILIZING REFLECTION COEFFICIENTS

BACKGROUND OF THE INVENTION

This application is a continuation-in-part of my copending application Ser. No. 840,335 filed July 7, 1969.

In a well completion, the string of casing or pipe is set in a well bore and cement is forced into the annulus between the casing and the well bore primarily to separate oil and gas producing horizons from each other and from water bearing strata. Obviously, if the cementing fails to provide a separation of one zone from another, then fluids under pressure from one zone may be able to migrate and contaminate an otherwise productive nearby zone. Migration of water, in particular, produces undesirable water cutting of a producing zone and possibly can make a well non-commercial.

It is difficult to obtain an accurate picture of conditions behind a casing because of the difficulty of propagating signals through the metal casing wall. Various prior proposals to determine the separation effectiveness, (i.e., the blocking or sealing characteristics) of the cement behind the casing have not been entirely successful in clearly determining the effective presence of cement in the annulus between the casing and the formation. Further, it has not been possible to measure reliably the quality of the cement bond between the casing and the cement and the quality of the cement bond between the cement and the formation using the methods of the various prior proposals.

The mere presence or absence of cement in the annulus between the casing and formation is valuable information, however, this does not provide a complete picture of the cement conditions. While cement may be present in the annulus, channels or indadequate sealing may still permit fluid communication between adjacent formations.

Use of the term "bond" in connection with the relationship of cement to the casing or the formation is somewhat vague, since adherence along the entire boundary between the casing and the cement or between the cement and formation is not necessary to prevent fluid communication between adjacent porous zones. All that is necessary of a bond is that the relationship prevents the migration of all fluids. Hereafter, reference to bond will mean that separation of zones by cement is adequate to prevent fluid migration between the zones.

Several prior developments for obtaining a measure of the quality of a cement bond relative to the casing have been disclosed in U.S. Pat. Nos. 3,291,247; 3,291,248 and 3,292,246. These patents are all assigned to the assignee of the present invention. These systems generally utilize acoustic principles where an acoustic signal is transmitted between a transmitter and a receiver. The amplitude of the early arrival signal (this early arrival is the casing signal since the acoustic impulse generally travels faster in the casing than in the surrounding cement or formation) at the receiver is measured as a determination of the quality of the bond of cement to the casing. If a good bond existed, the casing signal would be expected to be attenuated because of the energy dissipated from the casing to the cement and surrounding formations, whereas if no bond or a poor bond existed the casing signal would be relatively unattenuated. This procedure is sound enough if a good cement casing contact exists, but where a small space or annulus (sometimes called a micro-annulus) exists between the casing and the cement, such a measurement can give an indication of a poor cementing when the cementing is actually adequate. By adequate, it is meant that the micro-annulus even though present, does not permit fluid communication between adjacent porous formations. Moreover, such false indications of poor bonding can easily be the case because of the manner in which a cement job is performed.

In a primary cementing operation, cement is forced up the annulus about the casing by relatively high pressure applied inside the casing. This pressure tends to expand the casing. The pressure is maintained in the casing while the cement is setting and, once the cement is set, is then released. Upon release of the pressure the casing can contract, thus, forming a micro-annulus between the set cement and the casing.

A more refined technique for determining the quality of cement in the annulus between the casing and the formations is disclosed in U.S. Pat. No. 3,401,773 entitled, "Method and Apparatus for Cement Logging of Cased Boreholes" by Judson D. Synnott, III and assigned to the assignee of the present invention. In this technique the amplitude of a reverberated early (casing) signal arrival is recorded and additionally, the total energy of a selected later portion of the sonic signal is obtained by integration to provide a second indication of the quality of the cement bond. Even in the absence of a weak casing arrival, the additional step of observing the total energy obtained by integrating a later portion of the signal in this manner can confirm the presence of cement in the casing-formation-annulus. Details of related methods may also be had by reference to U.S. Pat. No. 3,401,772 entitled, "Methods for Logging Cased Boreholes" by Frank P. Kokesh, which is assigned to the assignee of the present invention.

While the foregoing methods and apparatus provide very useful information, it is desirable to more precisely determine the quality of the cement bond. For example, the energy content of the acoustic logging signals arriving at the receiver may depend on other factors than the cement bond to the casing or the integrity of the cement column (sometimes called cement quality). Factors which can influence acoustic energy are: the formation hardness; eccentering of the acoustic logging tool; construction materials of which the acoustic logging sonde is made; type of casing; and the diameter of the borehole and casing as well as their shape or geometry.

The recognition of these difficulties and some anomalous results in the various prior proposals has led to the development of the method and apparatus of the present invention which can provide a log with accurate indications of cementing effectiveness under a range of well conditions. This result is accomplished by use of a quantitative theoretical model of the cement problem coupled with analysis of the theoretical results and comparison of these results with acoustic logs taken from wells in the field.

Accordingly, it is an object of the present invention to provide a method and apparatus for determining cement effectiveness in a cased borehole.

It is a further object of the present invention to provide a method and apparatus for cement evaluation in a cased borehole which derives cement effectiveness by the evaluation of the reflection coefficients associated with radial modes or resonances of the sonde well-bore-casing-annulus-formation system.

A still further object of the present invention is to provide methods and apparatus for evaluating cement which yields improved results by examining the reflection coefficients associated with radial energy transfer of acoustic energy from the cased borehole into formation surrounding the borehole and by examining these reflection coefficients in a plurality of relatively broad frequency bands over the spectrum of acoustic energy used to excite the system.

Briefly, in accordance with the objects of the present invention, methods and apparatus for logging cased boreholes to obtain an evaluation recording of cement conditions are provided. The present invention considers the acoustic energy transfer from the sonde-wellbore-casing-annulus-formation system to examine the cement conditions in the annulus between the casing and the formation. This is made possible by the use of novel logging apparatus and methods including the use of a plurality of relatively broad bandpass filters which pass that portion of acoustic energy in broad frequency bands which are of particular value in determining the cement conditions. More specifically, a particular parameter, the reflection coefficient associated with the radial transfer of energy into the formation is examined in three relatively broad frequency band regions. Under a variety of well conditions the magnitude of the reflection coefficient in at least two of the three frequency bands is indicative of the cementing condition present in the annulus between the casing and the formation. Apparatus is provided to examine the relative reflection coefficient in each of the three selected frequency bands and to make the comparisons between the reflection coefficients in these bands in order to evaluate the cement condition.

The novel features of the present invention are set forth with particularity in the appended claims. The operation together with further objects and advantages of the invention may be best understood by way of illustration and examples of certain embodiments when taken in conjunction with the accompanying drawings.

BRIEF DESCRIPTION OF THE DRAWINGS

FIG. 1 is a schematic three dimensional view illustrating the cylindrical geometry of the sonde-borehole-casing system;

FIG. 2 is a schematic cross section view illustrating the layers of the system;

FIG. 8 shows the freqeuncy response characteristics of a typical acoustic logging transducer;

DESCRIPTION OF THE PREFERRED EMBODIMENT

Figure 3:
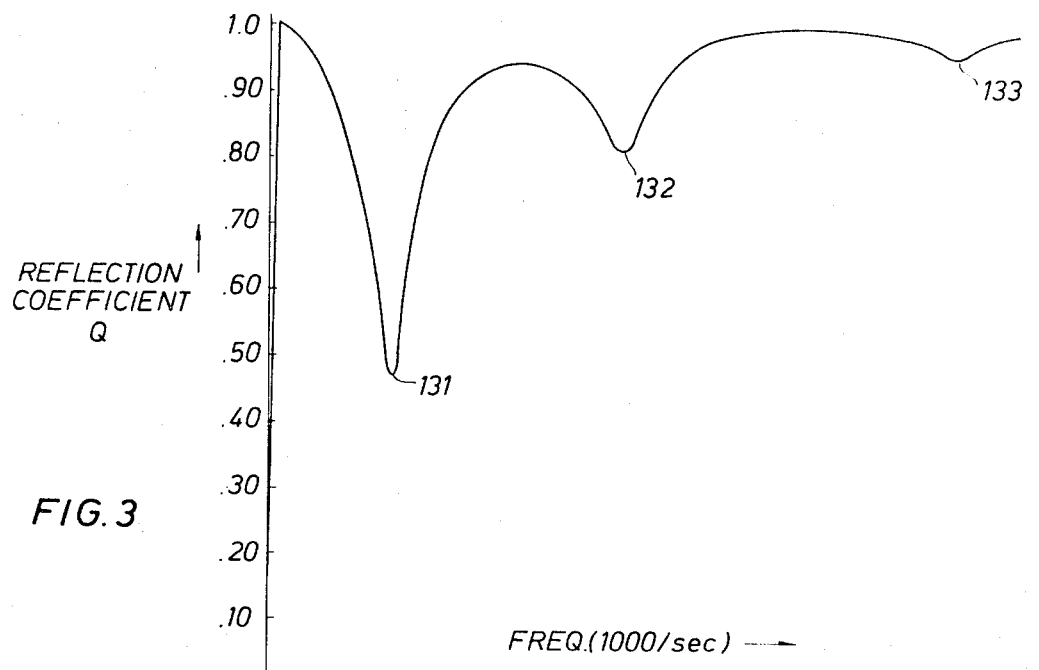
FIG. 3 is a typical reflection coefficient spectrum.

In a copending patent application entitled, "Cement Evaluation Logging" by J.H. Moran, et al., Ser. No. 840,290 filed on July 9, 1969, which is assigned to the assignee of the present invention, there is described methods and apparatus for cement evaluation logging which are based on the concept of examining certain parameters associated with the characteristic frequencies or radial modes or resonances of the well-bore-casing-annulus-formation system. In the present invention this concept is also utilized. The methods and apparatus of the present invention are directed to determining cement conditions in a cased borehole by the logging of what may be referred to as the reflection coefficient curves of the system in a plurality of relatively wide bandwidth frequency regions chosen appropriately in the acoustic energy spectrum used to excite the system.

Using the cylindrical coordinate system illustrated in FIG. 1, having cylindrical coordinates $r$, $\theta$, and $z$ the displacements of particles of the various media in the system when excited by acoustic energy can be denoted by the functions $U_r$, $U_\theta$, and $U_z$. Considering the case of cylindrical symmetry, in which the motion is uniform in all $\theta$, and the $z$ dependence may be ignored, (as discussed in the above referenced copending patent application this is valid near the characteristic frequencies or modes of the system) and only the $r$ dependent motion need be considered. This type of motion can be written in terms of a scalar potential function $\phi$ defined by:

$$U_r = \delta\phi/\delta r$$

The wave equation for the $r$ dependent motion is then $$(1/c^2)(\delta^2\phi/\delta t^2) = (\delta^2\phi/\delta r^2) + (1/r)(\delta\phi/\delta r)$$

(1)

Where $c$ is the speed of compressional waves in the system. This equation is derived from well-known physical principles and may for example, be found by reference to *Elastic Waves in Layered Media*, by Ewing, Jardetsky and Press, published by the McGraw Hill Company of New York, 1957 Edition.

The scalar potential function $\phi$ is, of course, time dependent as well as dependent on $r$, i.e., $\phi = \phi(r,t)$. However, the time dependence may be taken to be that of a travelling wave [i.e., $\phi(r,t) = F(r) e^{i\omega t}$] where $\omega = 2\pi f$ is the angular frequency of the wave motion of frequency $f$. Using this relation Equation (1) can be brought into the form $$-(\omega^2/c^2) F = (\delta^2 F/\delta r^2) + (1/r)(\delta F/\delta r) \quad (2)$$

Equation (2) is recognized as a form of Bessel's Equation having a general solution which may be written in the form $$F(r) = A\, H_o^{(1)}(kr) + B\, H_o^{(2)}(kr) \quad (2a)$$

Here $k = \omega/c$ is the wave number of the $r$ waves. $H_o^{(1)}(kr)$ and $H_o^{(2)}(kr)$ are called Hankel functions of the first and second kind, zero order. The coefficients $A$ and $B$ may be thought of as the complex amplitudes of incoming and outgoing waves, respectively, the $A$'s being the amplitude of incoming waves and the $B$'s as the amplitude of outgoing waves.

Recalling the definition of the displacement $U_r$ in terms of the potential function $\phi$ (the time dependent expotential function being dropped since it is merely a phase factor which does not influence the amplitude of the $r$ waves) the displacement may be written $$U_r = \delta\phi/\delta r = -kA\, H_1^{(1)}(kr) - kB\, H_1^{(2)}(kr) \quad (3)$$

where $H_1^{(1)}(kr)$ and $H_1^{(2)}(kr)$ are Hankel functions of the first and second kind, first order and again $k = \omega/c$ is the wave number.

The radial stress (which is equal to the pressure in the medium, if the medium is a fluid) may also be written in terms of the solution of Equation (1). The stress is defined as $$\tau r = (\lambda + 2\mu)(\delta^2\phi/\delta r^2) + (\lambda/r)(\delta\phi/\delta r) \quad (4)$$

where $\lambda$ and $\mu$ are the same Lame' constants which define the elastic properties of an isotropic solid. These are related to the compressional $C_D$ and shear $C_T$ wave velocities in a solid by $$C_D = \sqrt{(\lambda + 2\mu)/\rho} \quad (5)$$

$$C_T = \sqrt{\mu/\rho} \quad (6)$$

where $\rho$ is the density of the material. Using this relation the stress may be written as $$\tau r = A\,[(K/r)2\mu\, H_1^{(1)}(kr) - K^2(\lambda+2\mu)\, H_o^{(1)}(kr)]$$
$$+ B\,[(K/r)2\mu\, H_1^{(2)}(kr) - K^2(\lambda+2\mu)\, H_o^{(2)}(kr)] \quad (7)$$

The general solution (Equation 2a) above is valid in each of the several layers. This solution must now be adapted to the case of a particular problem of interest such as the cement evaluation problem. This may be accomplished by applying the boundary conditions of the problem at hand to determine the complex coefficients $A$ and $B$.

First (referring to FIG. 2) there are five layers (numbers 1–5) involved in the cement evaluation problem. While the general solution is valid in each layer, the coefficients $A$ and $B$ will be different in each layer, these may be referred to as $A_n$ and $B_n$ for their respective layers. In general, if $n$ is the number of layers there will be $2n$ coefficients to determine by applying the boundary conditions. Two boundary conditions which may be applied are 1. The displacement $U_r$ is continuous at the boundaries between each of the layers, i.e., $U_{r1} = U_{r2}$, $U_{r2} = U_{r3}$, etc. 2. The normal stress $\tau_r$ is continuous at the boundaries between each of the layers, i.e., $\tau_{r1} = \tau_{r2}$, $\tau_{r2} = \tau_{r3}$, etc. Since there are $n-1$ boundaries between $n$ layers of material these two boundary conditions will furnish $2(n-1) = 2n-2$ equations in the $2n$ unknown coefficients $A_n$ and $B_n$. Hence, two further boundary conditions must be imposed on the system to obtain a complete solution. These are supplied in the following manner.

In the outer layer (the formation) there is no further outer boundary to reflect waves. Hence, the coefficient $A_1$ for the outer layer must be zero (i.e., since the $A$'s may be thought of as the amplitudes of incoming waves). Also, inside the sonde (layer 5) it is impossible to distinguish incoming from outgoing waves at the origin of the coordinate system since, as the waves pass through the origin, they change from incoming waves to outgoing waves. This means that $A_5$ must equal $B_5$. These two extra boundary conditions provide the needed $2n$ equations which may be solved for the $2n$ unknown complex coefficients $A$ and $B$.

Finally, to complete the solution of the $2n$ equations for the $A$'s and $B$'s an account of the acoustic energy source used to excite the fluid must be provided. This represents the acoustic signal coming from the sonde and can have a frequency response comparable to that of typical acoustic logging transducers. This source function can be a function of displacement which is added to the boundary condition for displacement at the sonde-mud (i.e., layer 4–5 of FIG. 2) interface. A function of the form $$S(\omega) = \frac{-2\alpha_2(\alpha_1 - i\omega)}{[(\alpha_1 - i\omega)^2 - \alpha_2^2]^2} \times 1000 \quad (8)$$

in which $\alpha_1$ and $\alpha_2$ are adjustable constants, can be used. If $\alpha_1 = 120/\pi$ and $\alpha_2 = 120$ this gives a source function whose peak is at 19KC with a half width of about 13KC, typical of acoustic logging transducers in present use.

With these boundary conditions the $2n$ simultaneous equations for the coefficients $A_n$ and $B_n$ can be solved and various properties of the system which may be of interest can be observed. For example, one quantity, the ratio $A_4/B_4$ has been found to be of particular interest in evaluating cement conditions in the annulus between the casing and the formation. This quantity represents the ratio of the amplitudes of incoming to outgoing waves in the mud inside the casing. Such a quantity is accessible to measurement and may be thought of as a reflection coefficient which indicates how much acoustic energy escapes in the radial direction from the system into the formation.

FIG. 3 shows a representative reflection coefficient curve. The reflection coefficient Q is plotted verses frequency for the values given in Table 1. A value of reflection coefficient near 1 indicates very little energy escaping radially into the formation. Lower values indicate more energy escaping into the formation at a particular frequency. The first minimum 131 of FIG. 3 is due to a transmission resonance of the casing-annulus system at about 9KHz. The second minimum 132 is due to a transmission resonance of the annulus itself at about 27KHz. This frequency corresponds to a

TABLE I

| | |
|---|---|
| Casing Outer Diameter | 7 ⅝ inches |
| Casing Thickness | 0.32 inches |
| Borehole Diameter | 10 inches |
| Formation Compressional Travel Time | 100 u SEC/FT |
| Uncemented (Fluid Filled) Annulus | | wavelength which is equal to twice the annulus width. Other minima such as 133 appear at "harmonics" of this latter frequency for the wavelengths 2 $l/n$ $n = 1, 2, 3$ etc., where $l$ is the annulus width. An approximate expression for these frequencies is:

$$f_n = (nc/2l) \quad n = 1, 2, \text{---}$$

where $c$ is the speed of sound (compressional) in the annulus. From this it is apparent that if the annulus material is changed, (i.e., cement or no cement) the frequencies of the reflection coefficient minima are correspondingly changed.

Figure 4:
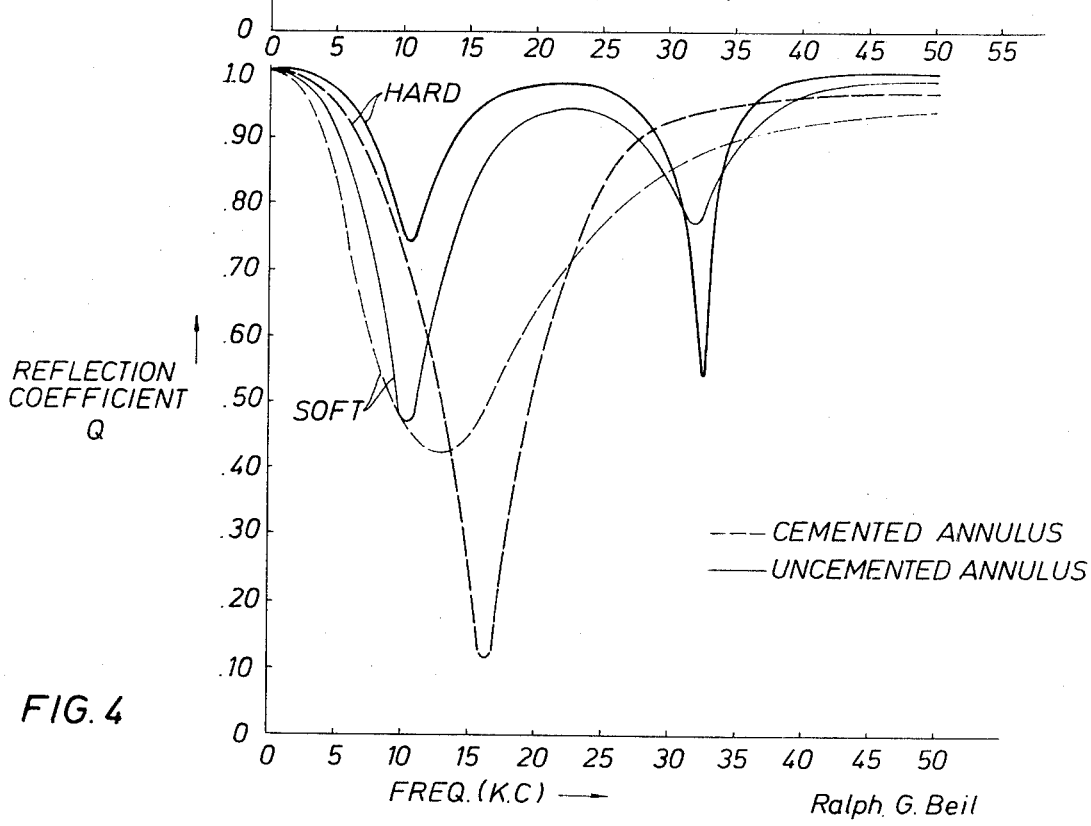
FIG. 4 is a reflection coefficient spectrum showing the variance of the reflection coefficient with formation type and cement or no cement in the annulus.

The graph of FIG. 4 clearly illustrates this point. The graphs are for the borehole parameters of Table II for uncemented annulus and cemented annulus, bounded by both hard and soft formations. The graphs of FIG. 4

TABLE II

| | |
|---|---|
| Casing Outer Diameter | 6 inches |
| Casing Thickness | 0.25 inches |
| Borehole Diameter | 8 inches |
| Formation Compressional Travel Time | (Soft) 100 u SEC/FT |
| | (Hard) 50 u SEC/FT | show that the reflection coefficient curves have great differences between the cemented and uncemented cases, particularly in the frequency range just above the first minimum of the curves. These differences have been found to appear independently of the spacing between the acoustic transmitter and receiver on the sonde and over a wide range of small annulus (microannulus) sizes between the casing and the cement. A quantitative measure of these differences can be made which would be an accurate indicator of cement conditions in the annulus. The method and apparatus to be discussed are intended to make just such a measurement.

Figure 5:
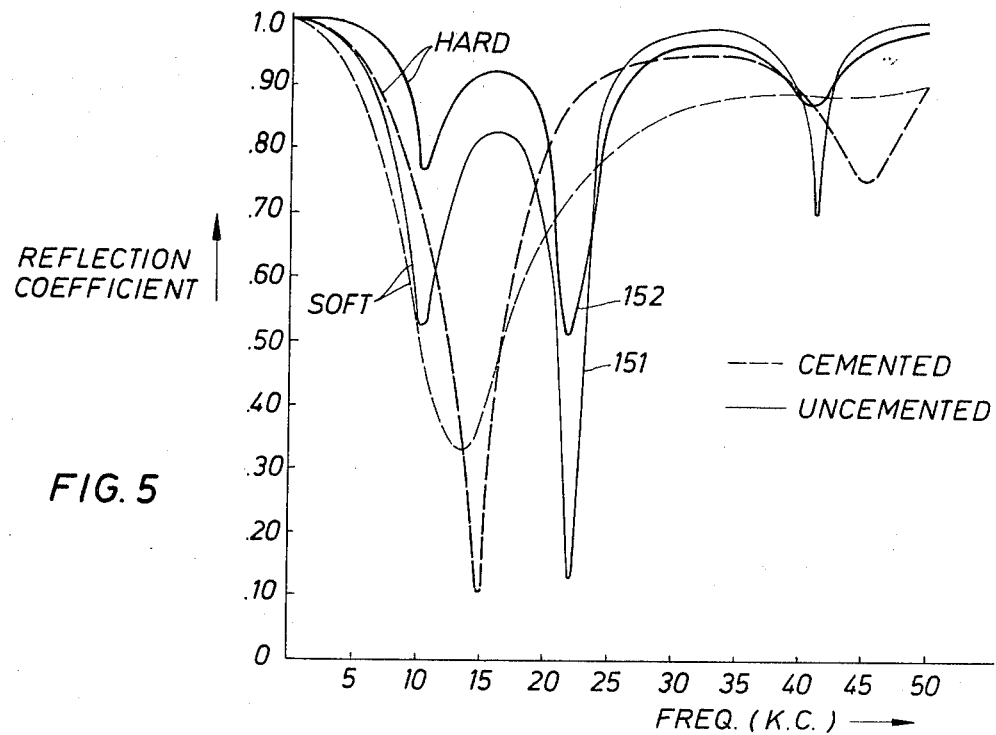
FIG. 5 shows multiple reflection coefficient spectra for larger annuli than those of FIG. 4.

If the entire frequency range above the first minimum in the reflection coefficient curve is used to examine the reflection coefficient minima, however, the results may not be reliable. This is due to the additional effect illustrated in FIG. 5. The graphs of FIG. 5 correspond to the parameters given in Table III.

TABLE III

| | |
|---|---|
| Casing Outer Diameter | 6 inches |
| Casing Thickness | 0.25 inches |
| Borehole Diameter | 9 Inches |
| Formation Compressional Travel Time | (Hard) 50 u SEC/FT |
| | (Soft) 100 u SEC/FT |

These graphs illustrate the effect of larger annulus widths on the reflection coefficient curves for cemented and uncemented conditions. As may be appreciated from these plots, for the larger annulus width the second minimum for the uncemented case is shifted lower in frequency (i.e., minima 151 and 152 of FIG. 5) and, in general, would tend to produce anomalous results in the frequency range 20 to 25KHz. That is, observation of the magnitude of the reflection coefficient minima in this range would produce results contrary to the general trend. The uncemented conditions result in lower reflection coefficients than those corresponding to the cemented conditions. For still larger annulus widths than those of the cases illustrated in FIG. 5, the third and higher minima can intrude into the low frequency range and further disturb the results expected from graphs such as those of FIG. 4. Since the annulus width may not be accurately known in all cases of actual well bores (i.e., generally the annulus width at a location will not be known unless a caliper is run prior to the setting of the casing and even then the cementing process can change the borehole diameter due to washouts or the like) some means must be provided to measure the cement in the annulus which is independent of the annulus width.

Such a means is provided in the present invention by the use of three relatively broad bandpass filters chosen to cover the frequency range above the first minimum. The filter pass bands are chosen so that under a given set of conditions only one of the filter bands is seriously affected by the anomaly described above. Thus, at least two of the three filters always give a correct reading of the general cementing trend. For a 6 inch casing, for example, such filters could be chosen having center frequencies of 12.5KHz, 20KHz and 35KHz and having passbands of 5KHz, 10KHz and 20KHz respectively. The passband width is defined by the frequency interval between the two symmetric half-amplitude points on either side of the central maximum in the filter response curve. The exact shape of the filter response curve is not of major importance.

If the center frequency and bandwidth of the three filters are chosen appropriately, then for any set of conditions outside the casing the outputs of two of the three filters in the combination would indicate a relatively low value if there were good cementing while at most one filter output would be relatively low if there were poor cementing.

The center frequencies of such a set of three optimally placed filters have been found to vary for different casing sizes. In the example shown in FIG. 6, a 6 inch casing O.D. was used with the center frequencies of the filters as indicated previously. In general, the filter center frequencies would be lower for larger diameter casing. An empirically derived relation between the lowest center frequency and the casing outer diameter has been determined to be $$f(\text{KHz}) = 50 \times [\ 1/\text{casing O.D. (in.)}] + 4.5$$

(9)

This establishes the lowest center frequency and the other filter center frequencies and bandwidths may then be established accordingly.

In the case of logging the well bore with acoustic logging tools of conventional design, it is not possible, unfortunately, to measure the reflection coefficient directly. This may be accomplished, however, with a logging tool designed for that purpose such as that disclosed in a copending patent application entitled, "Acoustic Reflection Coefficient Logging" by John D. Ingram, Ser. No. 840,179 filed July 7, 1969, now U.S.

Pat. No. 3,697,937 issued Oct. 10, 1972, which is assigned to the assignee of the present invention. However, it has been found that the methods of the present invention may be utilized with acoustic well logging tools of conventional design in the following manner.

The area under the reflection coefficient curve inside a filter band is approximately proportional to the acoustic pressure level which would be measured in the filter band. Recalling Equation (7) this result follows since the radial stress function $\tau_r$ (pressure) may be written in terms of the reflection coefficient Q as $$\tau_r = (a\,Q + b)/(c\,Q + d) \tag{10}$$

where $a$, $b$, $c$ and $d$ are complex expressions involving the Hankel functions. In Equation (10), the term $cQ$ is generally much smaller in magnitude than the complex function $d$. Since this is the case, the function $\tau_r$ may be said to be approximately a linear function of $Q$ (i.e., $\tau_r$ is directly proportional to $Q$ in the approximation made here). Hence, the radial stress (pressure) integrated over the bandpass of a filter is, to a good approximation, equivalent to the area under the reflection coefficient curve in the filter bandpass region. This enables useful logging of cement conditions with the three filter method using logging tools of conventional design since the pressure impinging on the surface of an acoustical receiving transducer is converted into an electrical signal proportional thereto. It will of course, be appreciated by those skilled in the art that direct logging of the reflection coefficients themselves could be performed with a logging tool such as that disclosed in the above-mentioned copending Ingram patent application yielding a similar result without making this mathematical approximation.

Figure 6:
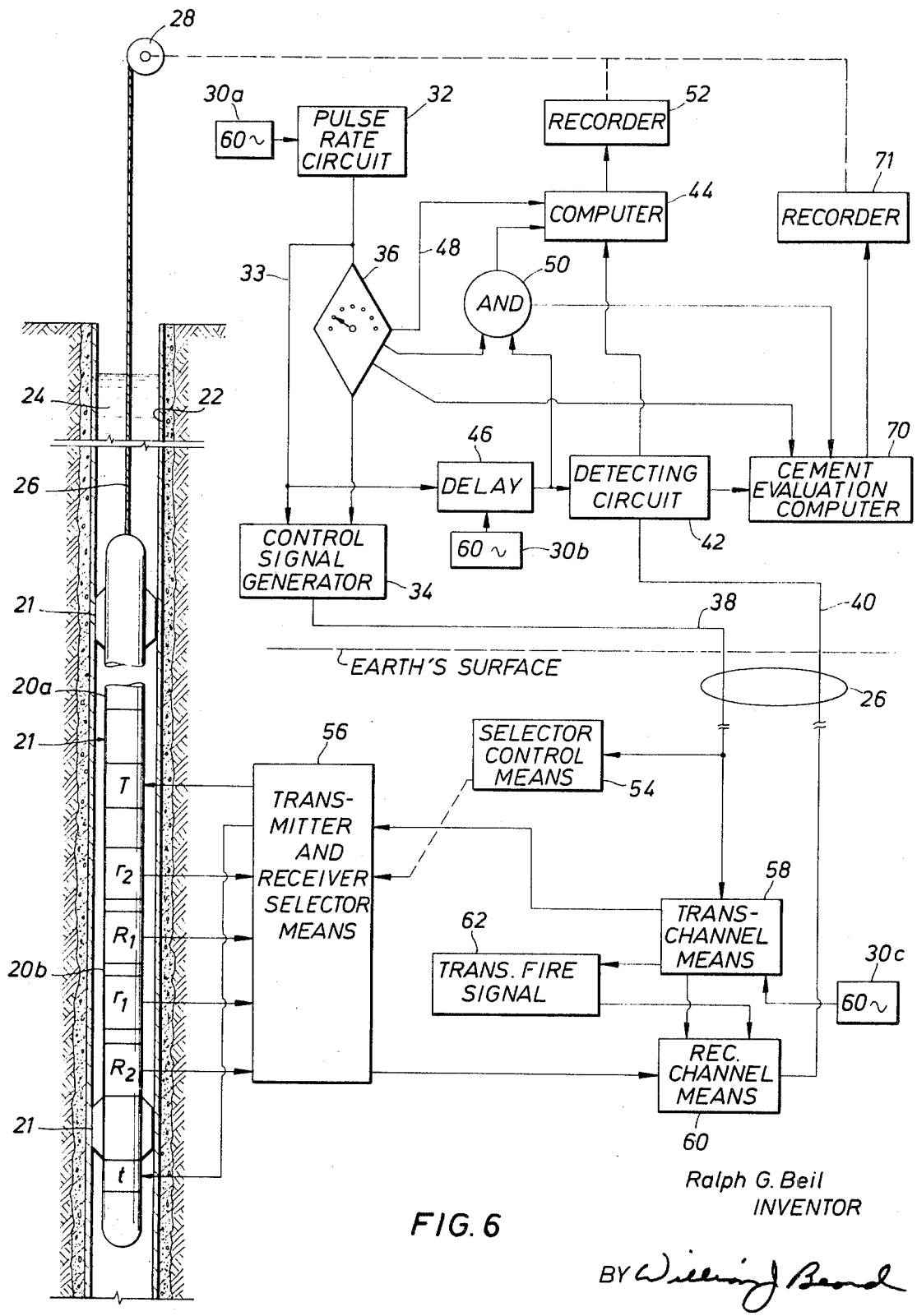
FIG. 6 shows an embodiment of a logging system using the principles of the present invention in block form.

In FIG. 6, the present invention is shown embodied in conjunction with an acoustic well logging tool of conventional nature, such as an acoustic travel time logging tool of the borehole effect compensated type. Details of the operation of the acoustic logging tool shown in FIG. 6, may be found by reference to U.S. Pat. No. 3,304,537 which is assigned to the assignee of the present invention. This tool has a plurality of acoustic transmitters and spaced receivers and may be employed for acoustic travel time logging over a portion of the borehole where the borehole effects are compensated for by making a plurality of measurements of acoustic travel time between each transmitter and a plurality of receivers and then combining these acoustic travel time measurements to obtain an average measure over a fixed interval of the borehole.

Although the derivation of the principles of the present invention is based on the assumption of the radial propagation of the acoustic energy only, it has been found that the present invention may be practiced with tools such as that shown in FIG. 6, due to the fact that considerable acoustic energy is propagated axially along the borehole. Further, this energy impinging on a receiver at an axial distance of a few feet from the acoustic transmitter is also proportional to the radial reflection coefficient described above. The actual relation is similar in form to Equation (10), but of considerably greater complexity and involving integrals over the wave numbers of conical waves propagating in the borehole. Due to the extreme mathematical difficulty of a more detailed analysis of this porblem, this point will not be pursued further. Experimental results have shown the correctness of this assumption of approximate proportionality between the reflection coefficient and the acoustic pressure at a receiver at a moderate distance from the transmitter. Thus, even though in the idealized case, energy is only propagated radially, in practice the energy is propagated axially along the borehole in such a manner as to enable the principles of the present invention to be applied with tools such as that shown in FIG. 6. It will, of course, be appreciated by those skilled in the art that other conventional acoustic logging tools other than the borehole compensated type could be used to practice the present invention. For purposes of brevity, practice of the methods of the present invention will be disclosed with a borehole effect compensated tool but it will be understood that the present invention is not limited to practice with such a tool.

Referring now to FIG. 6, the overall organization of a well logging system utilizing the principles of the present invention is shown in block form. An elongated logging tool 20 is suspended in a cased borehole 22 and is provided with the usual centralizers 21 adjacent its upper and lower ends for maintaining the tool centered as effectively as possible in the borehole 22. Borehole 22 is filled with the usual drilling mud or fluid 24.

The tool 20 is suspended in the well bore by means of an armored cable 26 extending from the upper end of the tool to the surface of the earth. The cable is spooled on a winch 28 (shown schematically), as is well-known in the art, the operation of which serves to raise and lower the tool through the well bore. Cable 26 may contain a plurality of conductors for providing paths for electrical signals between the surface equipment and the downhole apparatus, as well as to supply electrical power from a source on the earth's surface to the downhole equipment.

The tool 20 itself is divided into two portions. The upper portion 20A houses the electronic equipment carried by the tool while the lower portion 20B serves as a support for the acoustic transmitters and receivers. Although not illustrated in the drawing, it will be understood by those skilled in the art that the portion 20B of the housing can be so constructed that dierct transmission of acoustic energy therethrough from the transmitters to the receivers is either suppressed to a negligible level or delayed with respect to the travel times through the formations as to not interfere with measurements. Various types of housing construction such as of open work design are known in the art for this purpose.

The surface equipment of the system is shown generally in block form above the dotted line in FIG. 6. The master reference frequency for the overall operation of the logging system is provided by a 60 cycle per second power source which may be obtained from commercial power lines where available or from separate generators. Preferably, power is conducted from its source at the surface to the surface equipment and by suitable conductors in the cable 26 to the downhole equipment. For ease of illustration three separate 60 cycle per second inputs 30A, 30B and 30C are shown in FIG. 6. As will be seen from the ensuing description the 60 cycle per second source provides operating power for the electronic equipment as well as providing a reference frequency.

Master timing pulses for synchronizing the various components of the system are generated by the pulse rate circuit 32. This circuit provides a train of sharp pulses whose frequency is an integral submultiple of the 60 cycle reference frequency. Thus, for example, the repetition frequency of the timing pulses generated by the circuit 32 may vary from one-nineth to one-half of the 60 cycle reference frequency. Of course, other frequencies or ratios could be used if desired. Between each pair of successive pulses generated by the rate circuit 32, an individual measurement such as transmitter to receiver travel time measurement or a cement evaluation log measurement may be made. The pulse frequency selected will therefore depend on the particular type of formations expected to be encountered. A timing pulse rate that has been found suitable for a wide variety of applications is 20 pulses per second which provides a spacing between successive timing pulses of 50 milliseconds.

Timing pulses generated in pulse rate circuit 32 are transmitted via a conductor 33 directly to a control signal generator 34. The timing pulses also serve to synchronize operation of a selector programmer 36 whose output is delivered to the control signal generator 34. The selector programmer 36 may be provided with means such as a manually actuated switch arm which enables any of a plurality of measuring sequences for acoustic travel time measurements to be selected and alternatively allows selection of the cement evaluation log measurement. The cement evaluation log may be made simultaneously with an acoustic travel time measurement. Of course, in a cased borehole the travel time measurement will generally indicate only the casing arrival travel time as the casing is generally faster for acoustic propagation than the surrounding formations. This is useful information, however, because casing collars may be located on the travel time log, and additionally, the casing arrival amplitude may be used, as previously discussed, for an indication of cement bond. Between each successive pair of timing pulses from the rate circuit 32, the control signal generator provides a control signal over conductor 38 to the downhole equipment.

Electrical signals indicative of the acoustic measurements made in the downhole equipment are transmitted to the surface over conductor 40 in the cable 26. These signals are supplied to a detecting circuit 42 which produces an output correlated with the travel time measurements and which is suitable as an input to the travel time computer 44. Additionally, the detecting circuit 42 can provide input signals to the cement evaluation computer 70 which are processed in a manner to be subsequently described. Detecting circuit 42 is rendered responsive to electrical signals transmitted from the downhole equipment by timing pulses from the pulse rate circuit 32 transmitted via a fixed delay means 46. Delay means 46 is synchronized with the 60 cycle reference frequency 30B and ensures that the detecting circuit is not rendered operative until just prior to the expected arrival of a signal from the downhole equipment. This minimizes the possibility of errors resulting from spurious signals.

Computers 44 and 70 are enabled for operation directly from the programmer 36 and computer 44 is also conditioned by the output of AND circuit 50 which is responsive to the simultaneous application of signals from the delay means 46 and the programmer 36.

These instruction signals supplied to the computer 44 dictate the particular arithmetic sequence which is to be performed for acoustic travel time logging. They also provide computers 44 and 70 with reset information to prepare for the next computation cycle.

Outputs from computers 44 and 70 are in the form of electrical signals which are fed to indicating means such as recorders 52 and 71. As indicated by the dotted line the record feeding means for the recorders are mechanically linked to the winch 28 for movement therewith, whereby a plot of the acoustic travel time logs and the cement evaluation logs versus depth in the well are obtained.

Control signal pulses from the control signal generator 34 are conducted via a conductor 38 in the cable 26 to operate the downhole equipment shown below the dashed line FIG. 6 which is housed in the upper portion 20A of the logging tool 20. This equipment includes a selector and control means 54 which interprets the received control signal pulses to select a specific transmitter receiver combination to be activated during each measurement cycle. The actual selection is accomplished by a transmitter and receiver selector means 56 which responds to the selector control means to put into circuit the particular transmitter receiver pair desired.

The control signal pulses from the control signal generator 34 at the surface are also supplied to a transmitter channel means 58 in the downhole equipment. Transmitter channel means 58 is synchronized with a 60 cycle reference frequency 30C and performs a threefold function. Firstly, the transmitter channel means 58 provides an output current pulse to activate the transmitter selected by the selector means 56. This generates the acoustic energy for evaluating cement conditions and for making travel time measurements.

The transmitter channel means 58 also provides a blocking signal to deactivate a portion of the receiver channel means 60. The receiver channel 60 comprises a multi-stage amplifier provided with gating means to prevent an input signal to the first stage from reaching its output stage. The output of the transmitter channel means 58 supplies a blocking signal to the receiver channel means 60 which begins just prior to the generation of the transmitter output pulse and continues to a time just prior to the earliest possible arrival of a signal from the selected receiver. Thus, spurious signals or cross-talk, cannot be transmitted by the receiver channel means 60 to the surface equipment during this period. The input stage of the receiver channel means 60 is coupled by the selector means 56 to the selected receiver.

Transmitter channel means 58 also generates a transmitter fire signal at the time the transmitter is pulsed. This signal is a narrow pulse indicating the time of firing of a transmitter. The fire signal pulse is coupled to the unblocked output stage of the receiver channel means 60 and is transmitted immediately to the surface by conductor 40 indicating that a transmitter has been fired at this time.

After the input stage of the receiver channel means 60 is unblocked electrical signals resulting from the impinging acoustic energy sensed by the selected receiver will be amplified and transmitted to the surface by cable conductor 40. For each measurement then, there will be supplied to the surface equipment both a marking pulse indicative of the time of the firing of the transmitter and an electrical signal corresponding to the impinging acoustic energy at the associated receiver. It will be understood, of course, that the selected receiver in the logging tool converts the impinging acoustic energy into electrical signals having a waveform representative of such acoustic energy in a conventional manner.

As the details of the operation of the equipment for making acoustic travel time measurements may be had by reference to the above-mentioned patent, this will not be discussed further. Attention is directed to the operation of the cement evaluation computer 70 which may be seen in more detail in FIGS. 8 and 10.

Figure 7:
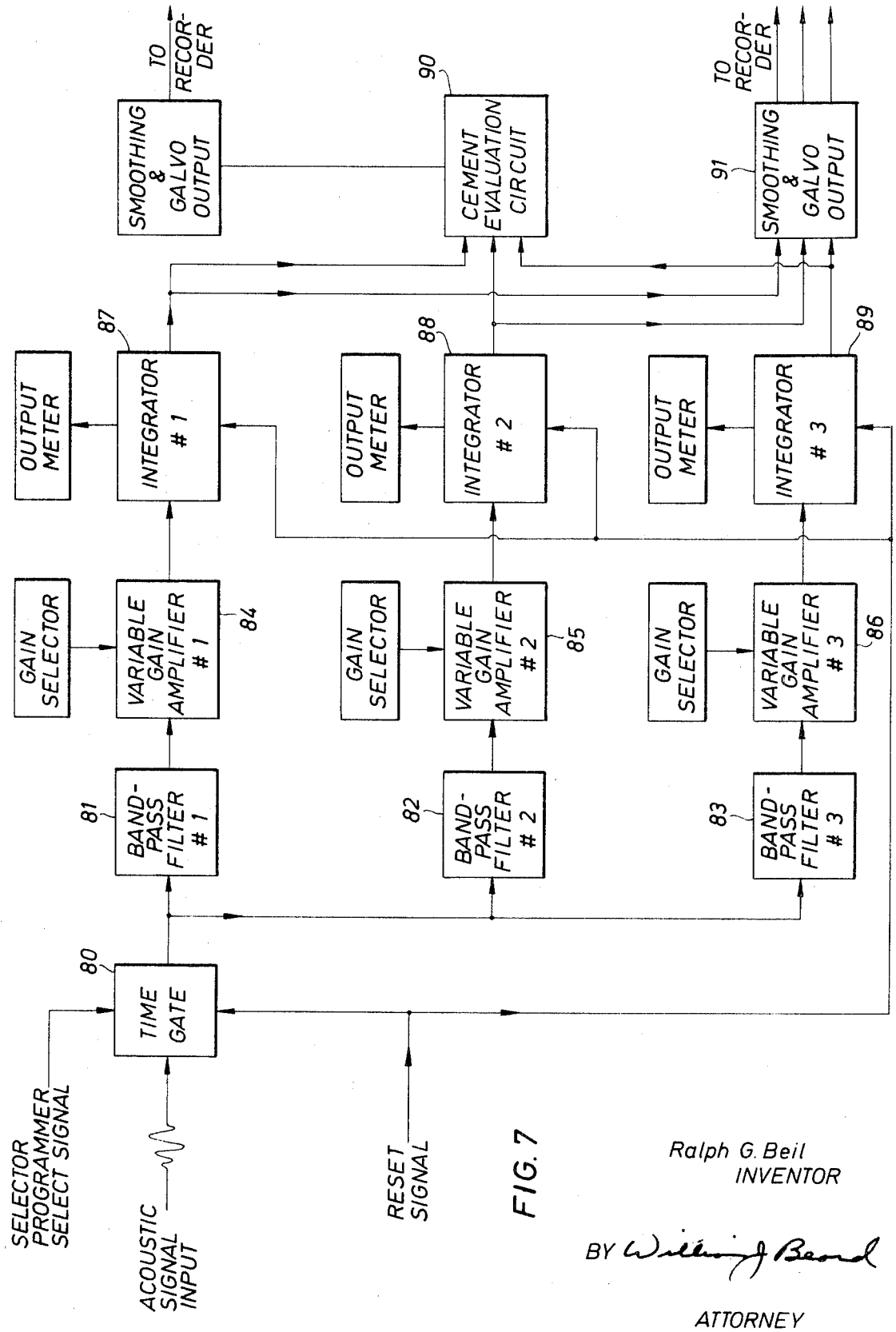
FIG. 7 is a block diagram of the cement evaluation computer of the present invention.

Referring now to FIG. 7, the acoustic signal from the downhole tool is amplified and applied to the input time gate 80 of the cement evaluation computer. Time gate 80 as previously discussed is conditioned for operation by the selector programmer select signal when it is desired to perform cement evaluation logging. From the time gate 80, the signal is input to 3 bandpass filters 81, 82 and 83. Bandpass filters 81, 82 and 83 may be conventional L-C filter networks which are designed with the desired center frequency and bandwidth as previously discussed for a particular casing size. For example, for 6 inch casing bandpass filter No. 1 may be a 10 to 15 kilohertz filter while bandpass filter No. 2 may pass the band from 15 to 25 kilohertz and bandpass filter No. 3 may be a bandpass filter from 25 to 45 kilohertz.

The outputs of bandpass filters 1, 2 and 3 are amplified in variable gain amplifiers 84, 85 and 86. These amplifiers amplify the signals from their respective bandpass filters to different degrees in order to remove any distortion present in the signal due to the acoustic frequency response of the downhole receiving transducers. This concept may be more readily appreciated by reference to FIG. 8, which shows the output frequency response of a typical acoustic logging transducer for a constant input signal level swept across its frequency spectrum with the frequency response bands of the three filters 81, 82 and 83 superimposed on this curve. It is apparent from FIG. 8, that such a receiving transducer would be considerably more sensitive in the frequency region of the bandpass filter No. 2, and that it would exhibit less sensitivity in the frequency region of bandpass filters No. 1 and No. 3. If it is desired to measure the absolute level of the output signal for the transducer as is desirable to measure the acoustic pressure for cement evaluation logging, then such a bias introduced by the frequency response of the transducer must be removed. The removal of this bias is assured by variable gain amplifiers 84, 85 and 86 which are adjusted to amplify the outputs of their respective filters in proportion to the frequency response of the receiving transducers in the downhole tool. This is easily accomplished since the frequency response of the acoustic transducers is well-known and once the frequency region of bandpass filter Nos. 81, 82 and 83 are established, then the gain of variable gain amplifiers as 84, 85 and 86 may be adjusted accordingly. This process may be referred to as normalizing the output of the bandpass filters.

Once the output signals of the bandpass filters are normalized in this manner the signals are integrated by integrators 87, 88 and 89 respectively. This is done, as was previously discussed, for the purpose of producing an electrical signal which is approximately proportional to the reflection coefficient in the frequency region of bandpass filters 81, 82 and 83. Integrators 87, 88 and 89 may be conventional R-C integrators in which the charge stored on a capacitor during the integration interval is proportional to the area under the curve of the signals in the bandpasses of filters 81, 82 and 83.

The output of integrators 87, 88 and 89 may be logged (i.e., recorded directly), or the signals may alternatively be further processed by the circuit 90 and logged as a single trace indicative of the cement conditions or percent of cement in the annulus. The operation of the cement evaluation circuit 90 may be seen in more detail by reference to FIG. 9.

Figure 9:
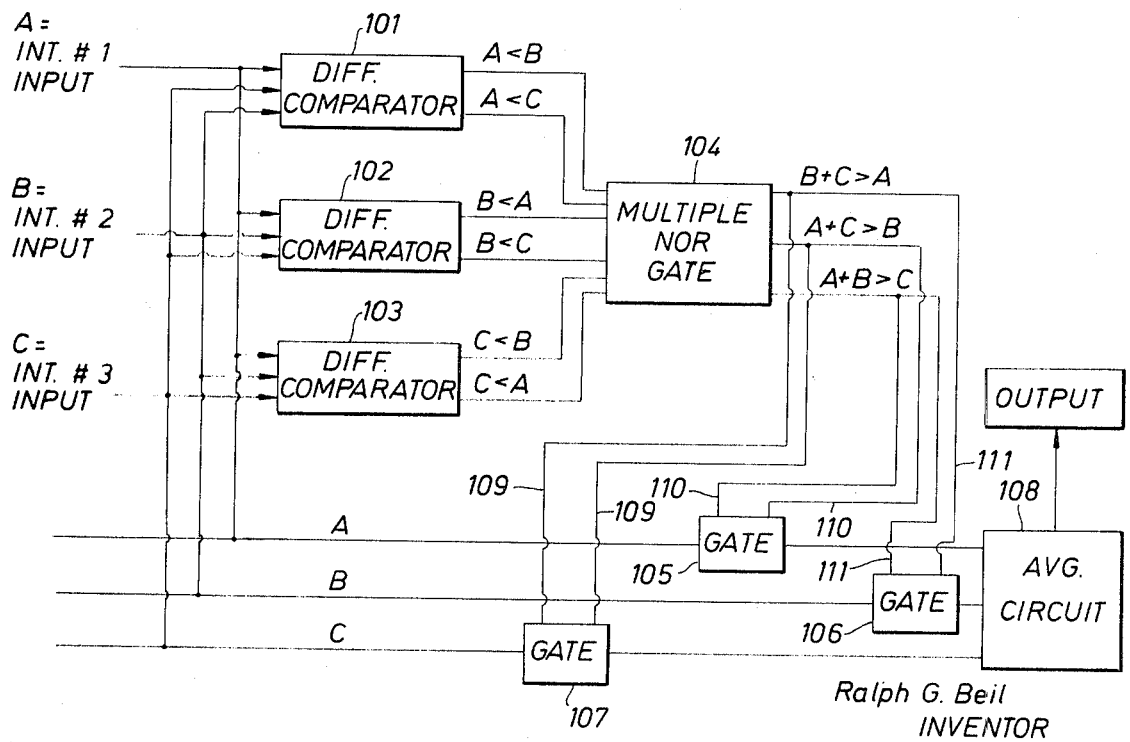
FIG. 9 is a block diagram of cement evaluation circuitry of the cement evaluation computer of the present invention.
Figure 10:
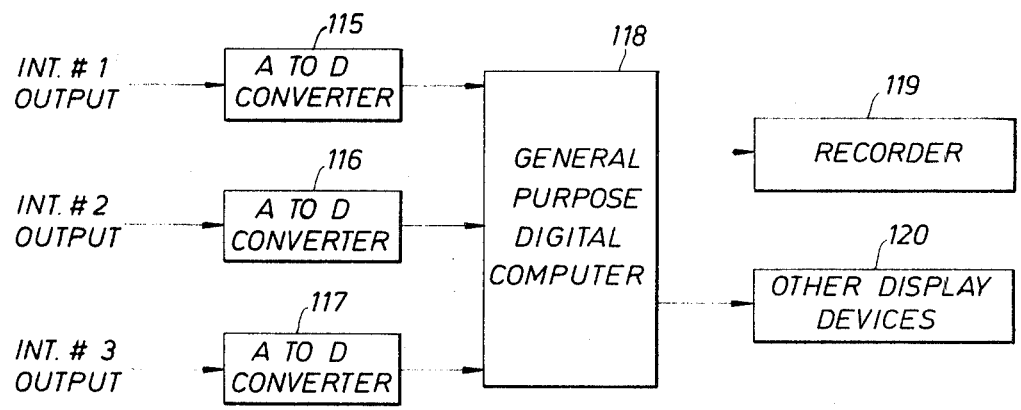
FIG. 10 is a block diagram showing a system utilizing a general purpose digital computer to perform the methods of the present invention.

Referring now to FIG. 9, details of an embodiment of the cement evaluation circuit are shown. This embodiment comprises three differential comparators 101, 102 and 103, a multiple NOR gate 104, three signal gates 105, 106 and 107 and an averaging circuit 108. The output signal from the averaging circuit is smoothed and relayed to the recorder by the smoothing circuit 91 of FIG. 8. The overall function of the circuit of FIG. 10 is to select and average the output signals from the two integrators having the lowest signal levels. Referring to the integrator input signals from integrators 87, 88 and 89 respectively as A, B and C, the operation of the circuit is as follows.

Differential comparators 101, 102 and 103 each receive all three of the input signals $A$, $B$ and $C$. These differential comparators each compare the relative magnitude of one of the input signals to each of the other two input signals. Each comparator has two outputs. There will be an output pulse from differential comparator 101, for example, on the line marked $A > B$, if the magnitude of signal $A$ is greater than that of signal $B$ and also, an output pulse on the line marked $A > C$, if $A$ is greater than $C$. Similarly, differential comparators 102 compares signal $B$ with the other two signals and differential comparator 103 compares signal C with the other two signals, each producing output pulses on the lines marked to indicate the result of these comparisons. If the condition marked on the output line is not satisfied there would be no output pulse produced on that line by the differential comparator, i.e., if $A$ is not greater than $B$, line $A > B$ would have no output pulse produced on it by differential comparator 101.

The output lines of the differential comparators are used as inputs to the multiple NOR gate cirucit 104. This circuit functions to select the two filter output signals which are lower than the third. Each individual NOR gate in the multiple NOR gate circuit 104 has two input leads. An output will result only if there is an input voltage present at both of its input leads simultaneously. Thus, for example, if the input leads to one individual NOR gate of the multiple NOR gate circuit are the leads marked $A > B$ and $A > C$ and a pulse is present on both these leads, then an output pulse will be produced on the multiple NOR circuit output lead marked $B + C < A$. Similarly, all the other possible combinations of signals are gated into the multiple NOR gate and the selection of the two signals of lowest value is performed. It should be noted that only one of the three output leads of the multiple NOR gate circuit 104 will have an output pulse present on it at a given time since only one of the output combinations is possible, i.e., one signal must be smaller than the other two by some finite amount. The output of the multiple NOR gate circuit is used to condition the three signal gates 105, 106 and 107.

Signal gates 105, 106 and 107 are used to control the passage of input signals A, B and C into the averaging circuit 108. Unless a signal is present one one of the secondary inputs 109, 110 or 111 of gates 105, 106 and 107, the gates will not permit passage of their primary input signals A, B and C into the averaging circuit. Thus, for example, if multiple NOR gate output $B + C > A$ has the output pulse present on it, then signal gates 106 and 107 will be conditioned to pass signals B and C to the averaging circuit 108. Similarly, the other multiple NOR gate outputs activate other pairs of the signal gates, allowing other signal combinations to reach the averaging circuit 108. Averaging circuit 108 then forms the average of the two lowest signals, which are its inputs, and this average, which is indicative of the cement condition in the annulus, is sent to the recorder smoothing circuit 91 of FIG. 7.

Figure 12:
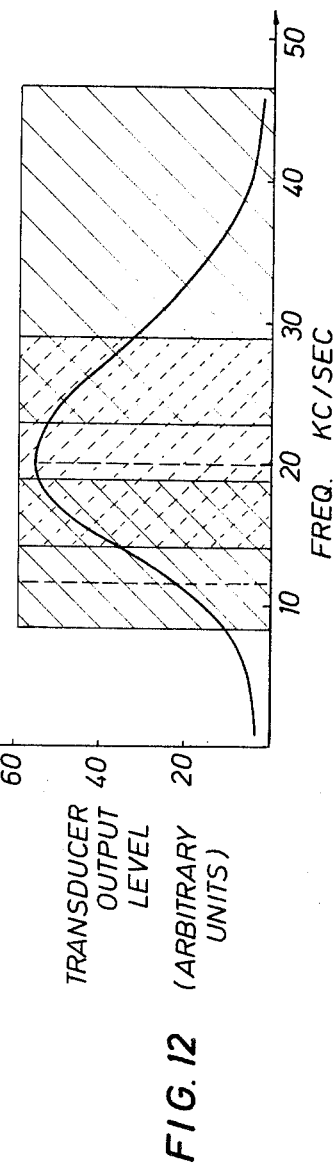
FIG. 12 shows the freqeuncy response characteristics of an acoustic logging transducer with the passband region of a set of filters in accordance with an embodiment of the present invention superimposed thereon.

It will be appreciated by those skilled in the art that the response of the bandpass filters used in the present invention need not be perfectly non-overlapping as shown schematically and discussed previously with respect to FIG. 8. It has been found, moreover, that some overlap in the filter response characteristics may be desirable to obtain consistently unambiguous results. The schematic bandpass filter responses with overlapping frequency ranges as shown in FIG. 12 have been found to be generally suitable for use in typical casing sizes encountered in oilfield use. That is, a low frequency filter having a 12KHz center frequency and −10 DB response points at 9KHz and 18KHz is suitable for this application. The median frequency filter can be centered at 19KHz and have −10 DB response points at 15KHz and 28KHz as illustrated in FIG. 12. The high frequency filter can have a 33KHz center frequency and −10 DB response points at 22 and 46KHz respectively. It should be noted from these data that the filter passbands such as shown schematically in FIG. 12 need not be symmetrical about their center frequency and that generally the shape of the passband is not of major importance. Some overlap in the filter passbands has been found to be desirable for consistent results as these data indicate.

Figure 13:
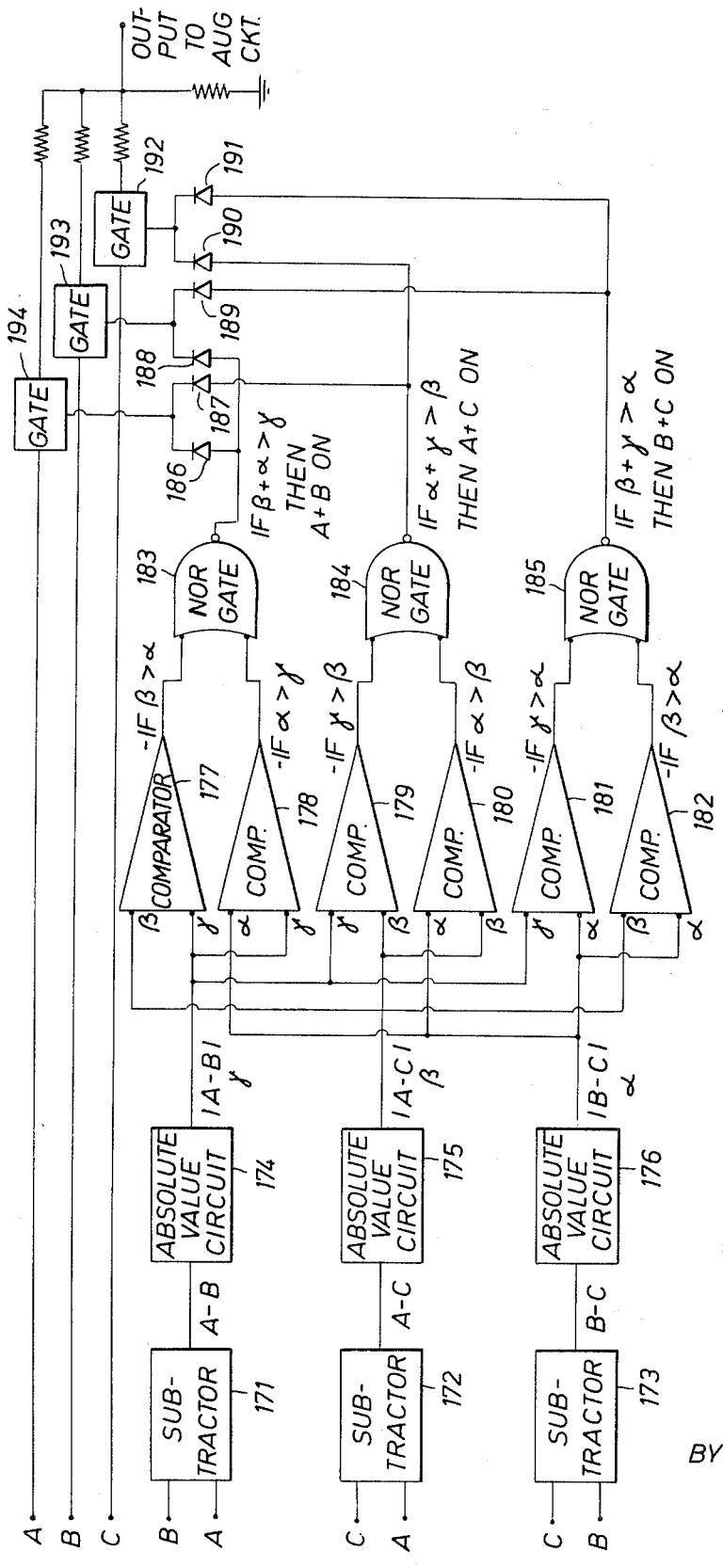
FIG. 13 shows a block diagram of an alternative embodiment of cement evaluation circuitry.

Another embodiment of the cement evaluation circuit 90 of FIG. 7 is illustrated in FIG. 13. The circuit of FIG. 13, rather than selecting the outputs of the two filter passbands which have the lowest values, selects the outputs of the two filter passbands which are closest together in value, or most nearly agree with each other. This embodiment has proven to be consistently useful for cement evaluation on data taken from wells having a known cement condition. Thus, the circuit of FIG. 13 is a useful alternative embodiment to the cement evaluation circuit shown in FIG. 9.

Referring now to FIG. 13, the circuit for selecting the two filter passband signals which are nearest to each other in value, or most nearly agree, is shown schematically. Here again, as in the discussion of FIG. 9, A refers to the signal from the integrator 87 of FIG. 7, B refers to the signal from the integrator 88 and C refers to the signal from the integrator 89. It will be recalled that these signals represent the area under the curve (normalized) from each of the bandpass filters which is approximately proportional to the reflection coefficient in each of the frequency regions covered by the bandpass filters 81, 82 and 83 of FIG. 7. The circuit of FIG. 13 is comprised of subtractors 171, 172 and 173 whose outputs are connected to absolute value circuits 174, 175 and 176. The absolute value circuits 174, 175 and 176 and the subtractors 171, 172 and 173 may be comprised of operational amplifier circuits having appropriate feedback resistor circuits (not shown) as known in the art.

The output of absolute value circuits 174, 175 and 176 are connected respectively to a plurality of comparator circuits 177, 178, 179, 180, 181 and 182. Comparator circuits 177–182 function to produce a negative pulse output if a particular absolute value exceeds the one it is being compared to. The outputs of comparators 177–182 are connected to NOR gates 183, 184 and 185 and the outputs of the NOR gates are used to condition signal gates 192, 193 and 194 via diodes 186–191.

The operation of the circuit of FIG. 13 may best be explained by use of an example. For this purpose assume that the voltage levels B and C are nearest together or most nearly agree with each other. In this case the circuit of FIG. 13 would select gates 192 and 193 to pass the integrator output signals B and C on to the average circuit to be processed as an indication of the cement condition in the annulus. Subtractors 171, 172 and 173 would function to form the signal differences $A-B$, $A-C$ and $B-C$ as indicated in the drawing. Absolute value circuits 174, 175 and 176 would form the absolute values of these expressions or $\gamma = |B-C|$, $\beta = |A-C|$ and $\alpha = |A-B|$. The signals representative of $\alpha$, $\beta$ and $\gamma$ are then input to comparator circuits 177–182 in the indicated manner. In this example, since the $\alpha$ signal would be smallest, since B and C voltage levels most nearly agree. Hence, comparators 181 and 182 would both produce negative outputs on the indicated conductors. The other comparator pairs 179, 180 and 177, 178 would not produce more than one negative output under this condition. Thus, only the two input leads to NOR gate 185 would be conditioned to allow the NOR gate to produce an output. The output from NOR gate 185 is then coupled via diodes 189 and 191 to signal gates 192 and 193 allowing the signals B and C only to pass on to the average circuit to be processed for cement condition logging output.

The circuit of FIG. 13 would function similarly in the other two cases where the signals $\beta$ or $\alpha$ were the smallest to condition signal gates 192 and 194 to pass A and C for output if $\beta$ is the smallest signal or to condition signal gates 193 and 194 to pass A and B if $\alpha$ is the smallest signal.

It will be appreciated by those skilled in the art that the outputs of integrators 87, 88 and 89 of FIG. 7 could be recorded on magnetic tape for later data processing by a general purpose digital computer, or if a small general purpose digital computer is available at the well site it could be used to process the signals immediately. Such a digital processing scheme is contemplated to be within the scope of this invention and a schematic diagram showing a portion of such a system is given in FIG. 10.

In FIG. 10, the outputs of integrators 87, 88 and 89 are shown entering analog-to-digital converters 115, 116 and 117. These outputs as just discussed could be taken directly from the integrators or taken off of magnetic tape. Alternatively, the raw acoustic waveforms from the downhole tool could be recorded on mangetic tape and played back into a system such as shown at FIG. 7, which is operated at a remote location, thus providing the integrator outputs. Alternatively, the raw acoustic waveform could be digitized in an A-to-D converter, input to a general purpose digital computer and broken down by Fourier analysis into their component frequencies and digitally filtered to produce the equivalent of the outputs of integrators 87, 88 and 89. In any case the integrator outputs may be converted to digital (binary) form and processed on a general purpose computer 118. A-to-D converters 115, 116 and 117 may be any of a variety of such devices which are well-known to the art. Similarly, general purpose computer 118 may be of any well-known type capable of accepting such input data.

Figure 11:
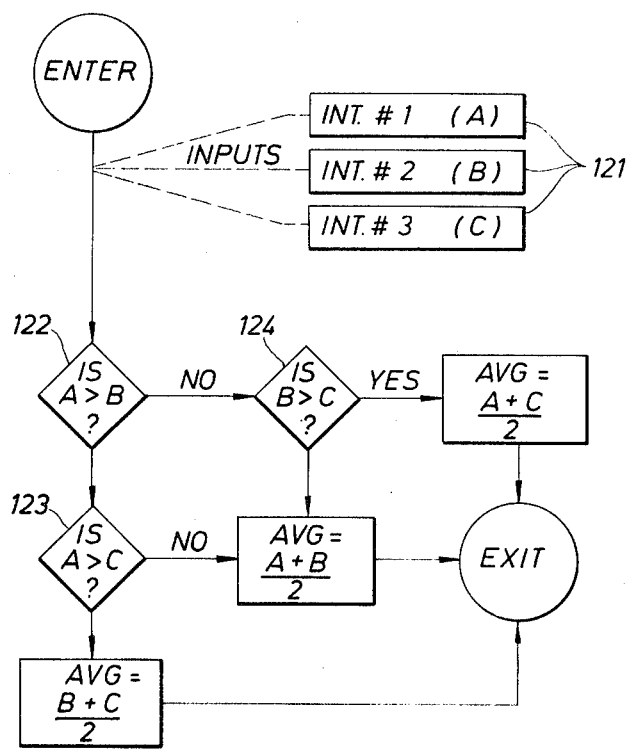
FIG. 11 is a flow diagram showing a digital computer subprogram for performing the cement evaluation logic.

Referring now to FIG. 11, a flow diagram for a sub-program for processing the integrator output data converted into digital form is shown. The sub-program may be part of the operating system of the computer 118 and is called for execution or entered on a periodic basis whenever such data is present to be processed. The sub-program performs basically the same computations performed by the cement evaluation circuit of FIG. 9. When the sub-program is entered the digitized values of integrator outputs $A$, $B$ and $C$ are available to it in the memory banks 121 of general purpose computer 118. Input $A$ is tested first against input $B$ at block 122. If $A$ is greater than $B$ then $A$ is also tested against $C$ at Block 123. If $A$ is greater than both $B$ and $C$ then the output variable (called AVG) is equal to $(B + C)/2$. If $A$ is greater than $B$ but less than $C$ then $AVG = (A + B)/2$. On the other hand, if $A$ is less than $B$ then $B$ is tested against $C$ at block 124 and if $B$ is greater than both $A$ and $C$ then $AVG = (A + C)/2$. Otherwise $C$ is the largest input variable and $AVG = (A + B)/2$. The variable AVG is then output to a recorder 119 or other computer display device 120 such as an oscilloscope or digital printer by other appropriate computer sub-programs of well-known type in general purpose computer 118. It will, of course, be appreciated that a computer program implementing the processing scheme of the circuit of FIG. 13 could likewise be employed if desired.

In either case of the analog-or-digital processing of the date the final result is an output display relating to the cement effectiveness as a function of depth in the well bore. Such a display could, for example, take the form of a log of percent cement in the annulus verses depth. As previously discussed the acoustic travel time log could be displayed along side this log together with a cement bond log based on a measurement of the amplitude of the early sonic arrival signal if desired. It is apparent that such a combination of logs will yield much more information about cement conditions in the annulus to the well operator than heretofore possible.

While a particular embodiment of the present invention has been shown and described, it is apparent that changes and modifications may be made without departing from this invention in its broader aspects; and, therefore, the aim in the appended claims is to cover all such changes and modifications as fall within the true spirit and scope of this invention.

What is claimed is:

1. A method for determining the cement effectiveness in a cased and cemented well bore comprising the steps of:

transmitting acoustic energy from the well bore into the casing and formations;

receiving a reflected portion of the transmitted acoustic energy and generating electrical signals representative thereof;

applying each of said representative electrical signals to at least three relatively wide bandpass frequency filters each having different center frequencies spaced over a frequency spectrum of the received acoustic energy for obtaining filtered output signals; and selecting at least two of the filtered output signals having the lowest magnitudes from said plurality of bandpass filters for a determation of the cement effectiveness.

2. The method of claim 1 and further including the steps of:

generating a signal representative of the average value of said selected filtered output signals having the lowest magnitudes; and recording as a function of borehole depth said signal representatative of the average value of said selected filtered output signals, the recording so produced being indicative of cement effectiveness as a function of depth in the well bore.

3. A method of processing electrical signals representative of radially reflected acoustic energy received in a cased borehole to evaluate cement effectiveness comprising the steps of:

applying said representative electrical signals to at least three relatively wide bandpass frequency filters having different center frequencies spaced over a frequency spectrum of the received acoustic energy;

integrating the output signals of said filters to generate signals representative of the magnitude of the acoustic reflection coefficient in the frequency region of the filter passbands; and generating signals representative of the average of at least two of the reflection coefficient signals having the lowest magnitudes said average signal being indicative of the cement effectiveness.

4. The method of claim 3 and further including the step of recording said average signal as a function of borehole depth.

5. The method of claim 3 and further including the step of recording at least two of the signals representative of the magnitude of the acoustic reflection coefficient in the frequency region of the filter passbands.

6. A method of logging a cased well borehole to determine the effectiveness of cement disposed in the annulus between the casing and the formations comprising the steps of:

moving an acoustic logging tool having at least one acoustic transmitter and at least one acoustic receiver through the borehole;

transmitting a component of acoustic energy radially outwardly from said transmitter into the casing and formations;

receiving a reflected portion of said transmitted acoustic energy and generating electrical signals representative thereof;

passing each of said representative signals through at least three relatively wide bandpass frequency filters having different center frequencies spaced over the frequency spectrum of the received acoustic energy to obtain a filtered output signal;

integrating the filtered output signals of each of said filters to generate signals representative of the magnitude of the acoustic reflection coefficient in the frequency regions of the filter passbands; and generating a signal representative of the average of at least two of the lowest magnitude reflection coefficient signals, said average signal being indicative of the cement effectiveness.

7. The method of claim 6 wherein the steps of transmitting and receiving acoustic energy in the borehole are performed repetitively as said logging tool moves through the borehole and the remaining signal processing steps are performed repetitively with such transmitter firing.

8. The method of claim 6 and further including the step of recording as a function of borehole depth said signal representative of the average of the two lowest magnitude reflection coefficient signals.

9. The method of claim 8 and further including the step of recording as a function of borehole depth said signals representative of the magnitude of the acoustic reflection coefficients in the frequency region of each of the filter passbands.

10. The method of claim 6 and further including the step of recording as a function of borehole depth said signals representative of the magnitude of the acoustic reflection coefficients in the frequency region of each of the filter passbands.

11. The method of claim 6 wherein the step of passing said representative signals through said relatively wide bandpass frequency filters having different center frequencies is performed by passing said signals through three such filters having different bandwidths and different center frequencies spaced over the frequency spectrum of the received acoustic energy.

12. The method of claim 11 and further including the step of recording as a function of borehole depth said signal representative of the average of the two lowest magnitude reflection coefficient signals, said average signal being indicative of the cement effectiveness.

13. The method of claim 12 and further including the step of recording as a function of borehole depth said three signals representative of the magnitude of the acoustic reflection coefficient in the frequency regions of the three filter passbands.

14. Apparatus for determining the cement effectiveness in a cased well bore comprising:
transducer means for transmitting a component of acoustic energy radially outward from the well bore into the casing and formations and for receiving a reflected portion of the transmitted acoustic energy and generating electrical signals representative thereof;
at least three relatively wide bandpass frequency filters coupled to said transducer means, said filters and having different center frequencies spaced over a frequency spectrum of the received acoustic energy; and
means coupled to said filters for processing said signals to obtain at least the two lowest magnitude output signals of said bandpass filters.

15. The apparatus of claim 14 and further including:
means coupled to said processing means for generating a signal representative of the average value of said lowest magnitude signals; and
means for recording as a function of borehole depth said signals representative of the average value of said lowest magnitude signals, whereby the recording so produced is indicative of cement effectiveness as a function of depth in the well bore.

16. Apparatus for processing electrical signals representative of radially reflected acoustic energy received in a cased borehole to evaluate cementing effectiveness comprising:
at least three relatively wide bandpass frequency filters having different center frequencies spaced over a frequency spectrum of the received acoustic energy for receiving such representative electrical signals;
means for integrating the output signals of said filters to generate signals representative of the magnitude of the acoustic reflection coefficient in the frequency region of the filter passbands; and
means for generating an electrical signal representative of the average of at least two of the reflection coefficient signals having the lowest magnitudes.

17. The apparatus of claim 16 and further including: recording means coupled to said average generating means for recording said average signal as a function of borehole depth.

18. The apparatus of claim 16 and further including means for recording at least two of the signals representative of the magnitude of the acoustic reflection coefficient in the frequency region of the filter passbands.

19. Apparatus for logging a cased well borehole to determine the effectiveness of cement disposed in the annulus between the casing and the formations comprising:
an acoustic logging tool having at least one acoustic transmitter and at least one acoustic receiver;
means for moving said acoustic logging tool through different depths in the borehole;
means for repetit-ively firing said acoustic transmitter to transmit acoustic energy radially outwardly from said logging tool into the casing and formations;
means for repetitively activating said acoustic receiver in response to said transmitter firing to receive a reflected portion of the transmitted acoustic energy and generate electrical signals representative thereof;
at least three relatively wide bandpass frequency filters having different center frequencies spaced over a frequency spectrum of the received acoustic energy;
means for passing said representative signals through said bandpass frequency filters;
means for integrating the output signals of each of said frequency filters to generate signals representative of the magnitude of the acoustic reflection coefficient in the frequency region of the filter passbands; and
means for generating a signal representative of the majority of the lowest magnitude reflection coefficient signals.

20. The apparatus of claim 19 and further including:
means for generating a signal representative of the average of the two of said reflection coefficient signals having most nearly the same magnitude.

21. The apparatus of claim 19 and further including:
means for recording as a function of borehole depth said signals representative of the magnitude of the acoustic reflection coefficients in the frequency region of each of the filter passbands.

22. The apparatus of claim 19 and further including:

means for simultaneously recording as a function of borehole depth both said signals representative of the reflection coefficients in the frequency region of the filter passbands and said signal representative of the average of the two lowest such reflection coefficient signals.

23. The apparatus of claim 19 wherein said frequency filters comprise three relatively wide bandpass frequency filters having different bandwidths and different center frequencies spaced over a frequency spectrum of the received acoustic energy.

24. A method of acoustically logging a cased well borehole to determine the effectiveness of cement disposed in the annulus between the casing and the formations, comprising the steps of:
moving an acoustic logging tool having at least one acoustic transmitter and at least one acoustic receiver longitudinally spaced from said transmitter through the borehole;
repetitively transmitting acoustic energy from said transmitter into the casing and surrounding formations;
repetitively receiving in response to the acoustic transmission a reflected portion of said transmitted acoustic energy and generating electrical signals representative thereof;
passing said representative signals through three relatively wide bandpass frequency filters having different center frequencies spaced over the frequency spectrum of the received acoustic energy;
integrating the output signals of each of said filters to generate signals representative of the magnitude of the acoustic reflection coefficient in the frequency region of the filter passbands;
generating a signal representative of the average of the two lowest magnitude reflection coefficient signals, said average signal being indicative of the cementing effectiveness in the borehole;
simultaneously with the above steps measuring the acoustic travel time of the transmitted acoustic signal between said longitudinally spaced transmitter and receiver and generating a signal representative thereof; and
recording as a function of borehole depth said acoustic travel time signal and said average signal.

25. The method of claim 24 and further including the step of simultaneously recording said acoustic reflection coefficient signals.

26. A method of acoustically logging a cased well borehole to determine the effectiveness of cement disposed in the annulus between the casing and the formations, comprisign the steps of;
moving an acoustic logging tool having at least one acoustic transmitter and at least one acoustic receiver longitudinally spaced from said transmitter through the borehole;
repetitively transmitting acoustic energy from said transmitter into the casing and surrounding formations;
repetitively receiving in response to the acoustic transmission a reflected portion of said transmitted acoustic energy and generating electrical signals representative thereof;
passing said representative signals through three relatively wide bandpass frequency filters having different center frequencies spaced over the frequency spectrum of the received acoustic energy;
integrating the output signals of each of said filters to generate signals representative of the magnitude of the acoustic reflection coefficient in the frequency region of the filter passband;
generating a signal representative of the average of the two lowest magnitude reflection coefficient signals, said average signal being indicative of the cementing effectiveness in the borehole;
simultaneously with the above steps measuring the acoustic travel time of the transmitted acoustic signal between said longitudinally spaced transmitter and receiver and generating a signal representative thereof;
recording as a function of borehole depth said acoustic travel time signal and said average signal;
simultaneously with the above steps measuring the amplitude of the early arriving acoustic signal and generating a signal representative thereof, said signal being indicative of the contact of the cement disposed in the annulus with the exterior surface of the well casing; and
recording as a function of borehole depth said cement contact signal, said acoustic travel time signal and said average signal.

27. A method for determining the cement effectiveness in a cased and cemented well bore comprising the steps of:
transmitting acoustic energy from the well bore into the casing and formations;
receiving a reflected portion of the transmitted acoustic energy and generating signals representative thereof;
applying said representative signals to at least three relatively wide bandpass frequency filters each having different center frequencies spaced over a frequency spectrum of acoustic energy for obtaining filtered output signals; and
selecting at least two of the filtered output signals having most nearly the same magnitudes for a determination of the cement effectiveness.

28. The method of claim 27 and further including the steps of:
generating a signal representative of the average value of the selected filtered output signals; and
recording as a function of borehole depth said signal representative of the average value of said selected filtered output signals.

29. A method of processing electrical signals representative of radially reflected acoustic energy received in a cased borehole to evaluate cement effectiveness comprising the steps of:
applying said representative signals to at least three relatively wide bandpass frequency filters having different center frequencies spaced over a frequency spectrum of acoustic energy;
integrating the output signals of said filters to generate signals representative of the magnitude of the acoustic reflection coefficient in the frequency region of the filter passbands; and
generating signals representative of the average of at least two of the reflection coefficient signals having most nearly the same magnitudes, said average signal being indicative of the cement effectiveness.

30. The method of claim 29 and further including the step of recording said average signal as a function of borehole depth.

31. The method of claim 29 and further including the step of recording at least two of the signals representative of the magnitude of the acoustic reflection coefficient in the frequency region of the filter passbands.

32. A method of logging a cased well borehole to determine the effectiveness of cement disposed in the annulus between the casing and the formations comprising the steps of:
- moving an acoustic logging tool having at least one acoustic trasnmitter and at least one acoustic receiver through the borehole;
- transmitting a component of acoustic energy radially outwardly from said transmitter into the casing and formations;
- receiving a reflected portion of said transmitted acoustic energy and generating electrical signals representative thereof;
- passing said representative signals through at least three relatively wide bandpass frequency filters having different center frequencies spaced over the acoustic frequency spectrum to obtain filtered output signals;
- integrating said filtered output signals to generate signals representative of the magnitude of the acoustic reflection coefficient in the frequency region of the filter passbands; and
- generating a signal representative of the average of at least two selected reflection coefficient signals.

33. The method of claim 32 wherein the step of generating a signal representative of the average of at least two selected reflection coefficient signals comprises generating such a signal representative of the two reflection coefficient signals whose magnitude are most nearly the same.

34. The method of claim 33 and further including the step of recording said average representative signal as a function of borehole depth.

35. The method of claim 34 and further including the step of recording said acoustic reflection coefficient signals as a function of borehole depth.

36. Apparatus for processing electrical signals representative of radially reflected acoustic energy received in a cased borehole to evaluate cement effectiveness comprising:
- at least three relatively wide bandpass frequency filters having different center frequencies spaced over the acoustic frequency spectrum;
- means for applying said repre-sentative signals to said filters; means responsive to the outputs of said filters for generating signals representative of the magnitude of the acoustic reflection coefficient in the frequency region of the filter passbands; and
- means for generating a signal representative of the average of at least two of the reflection coefficients signals having most nearly the same magnitudes.

37. The apparatus of claim 36 and further including: recording means coupled to said average generating means for recording said average signal as a function of borehole depth.

38. A method of logging a cased well borehole to determine the effectiveness of cement disposed in the annulus between the casing and the formations comprising the steps of:
- transmitting a component of acoustic energy radially outwardly from the borehole into the casing and surrounding formations;
- receiving a reflected portion of said transmitted energy and generating electrical signals representative thereof;
- separating the signal representative of the received energy into its acoustic frequency spectrum components;
- selecting at least three of said frequency spectrum components over at least three different, relatively wide, bandwidths and generating signals functionally related to the acoustic reflection coefficient in the portion of the acoustic spectrum of said selected components; and
- generating a cement effectiveness signal which is functionally related to said reflection coefficient signals.

39. The method of claim 38 wherein the step of generating a cement effectiveness signal is performed by determining the two reflection coefficient signals having the smallest magnitudes and generating a signal representative of the average of these two signals.

40. The method of claim 38 wherein the step of generating a cement effectiveness signal is performed by determining the two reflection coefficient signals having most nearly the same magnitude and generating a signal representative of the average of these two signals.

41. The method of claim 38 wherein the step of generating a cement effectiveness signal includes selecting the two reflection coefficient signals having the smallest magnitudes and generating from such selected signals said signal representative of the cement effectiveness.

42. The method of claim 38 wherein the step of generating a cement effectiveness signal includes selecting the two reflection coefficient signals having most nearly the same magnitude and generating from such selected signals said signal representative of the cement effectiveness.

43. A method of processing data representative of radially reflected acoustic energy received in a cased well borehole to determine the effectiveness of cement disposed in the annulus between a casing and surrounding formations comprising the steps of:
- separating said data representative of the received energy into its acoustic frequency spectrum components;
- selecting a plurality of said frequency spectrum components over a plurality of different, relatively wide, bandwidths;
- generating from said selected plurality frequency spectrum components data functionally related to the acoustic reflection coefficient in the portion of the acoustic spectrum of each of said selected spectrum components; and
- generating a cement effectiveness output which is functionally related to said reflection coefficient data.

44. The method of claim 43 wherein the step of generating a cement effectiveness output includes selecting the reflection coefficient data from at least two of said frequency spectra having the smallest magnitudes and generating from such selected data said output representative of the cement effectiveness.

45. The method of claim 43 wherein the step of generating a cement effectiveness output includes selecting the two reflection coefficient data from at least two of said frequency spectra having the smallest magnitudes and generating from such selected data said output representative of the cement effectiveness.

* * * * *